`US012490210B2`

United States Patent
Cavalcanti et al.

(10) Patent No.: US 12,490,210 B2
(45) Date of Patent: Dec. 2, 2025

(54) APPARATUS, SYSTEM, AND METHOD OF COMMUNICATION DURING A SYNCHRONIZED TRANSMIT OPPORTUNITY (S-TxOP)

(71) Applicant: INTEL CORPORATION, Santa Clara, CA (US)

(72) Inventors: Dave Cavalcanti, Portland, OR (US); Dibakar Das, Hillsboro, OR (US); Laurent Cariou, Milizac (FR); Javier Perez-Ramirez, North Plains, OR (US); Dmitry Akhmetov, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 584 days.

(21) Appl. No.: 17/854,271

(22) Filed: Jun. 30, 2022

(65) Prior Publication Data
US 2022/0338147 A1    Oct. 20, 2022

(51) Int. Cl.
*H04W 56/00* (2009.01)
*H04L 1/1607* (2023.01)
*H04W 28/02* (2009.01)

(52) U.S. Cl.
CPC ....... *H04W 56/0015* (2013.01); *H04L 1/1614* (2013.01); *H04L 1/1657* (2013.01); *H04W 28/0268* (2013.01)

(58) Field of Classification Search
CPC .......... H04W 56/0015; H04W 28/0268; H04L 1/1614; H04L 1/1657
See application file for complete search history.

(56) References Cited

U.S. PATENT DOCUMENTS

2009/0225734 A1* 9/2009 Stephens ............... H04W 28/06
370/338
2014/0355509 A1* 12/2014 Zhao ................... H04L 61/5069
370/312
(Continued)

FOREIGN PATENT DOCUMENTS

| WO | WO-2019236052 A1 * | 12/2019 | ........ H04W 74/0808 |
| WO | WO-2020005195 A1 * | 1/2020 | .......... H04W 74/002 |
| WO | WO-2023191802 A1 * | 10/2023 | ............ H04W 74/04 |

OTHER PUBLICATIONS

IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications, IEEE Computer Society, IEEE Std 802.11™-2020 (Revision of IEEE Std 802.11-2016), Approved Dec. 3, 2020, 4379 pages.

*Primary Examiner* — Michael J Moore, Jr.
(74) *Attorney, Agent, or Firm* — Shichrur & Co.

(57) ABSTRACT

For example, an apparatus may be configured to cause an Access Point (AP) to transmit a frame over a wireless communication channel, the frame including a field according to a first Physical layer Protocol Data Unit (PPDU) version decodable by a wireless communication (STA) of a first STA type, the field configured to indicate to the STA of the first STA type that the wireless communication channel is to be reserved for a reserved duration; and to communicate a low-overhead PPDU with a STA of a second STA type over the wireless communication channel during a Synchronized Transmit Opportunity (S-TxOP), wherein the S-TxOP is within the reserved duration, wherein the low-overhead PPDU is configured according to a second PPDU version decodable by the STA of the second STA type, the low overhead PPDU including a low-overhead preamble excluding one or more preamble fields of the first PPDU version.

25 Claims, 7 Drawing Sheets

---

502
Transmit from an Access Point (AP) a frame over a wireless communication channel, the frame including a field according to a first Physical layer Protocol Data Unit (PPDU) version decodable by a wireless communication (STA) of a first STA type, the field configured to indicate to the STA of the first STA type that the wireless communication channel is to be reserved for a reserved duration 504
Communicate a low-overhead PPDU with a STA of a second STA type over the wireless communication channel during a Synchronized Transmit Opportunity (S-TxOP), wherein the S-TxOP is within the reserved duration, wherein the low-overhead PPDU is configured according to a second PPDU version decodable by the STA of the second STA type, the low overhead PPDU including a low-overhead preamble excluding one or more preamble fields of the first PPDU version

(56) References Cited

U.S. PATENT DOCUMENTS

| | | | |
|---|---|---|---|
| 2022/0287049 A1* | 9/2022 | Cavalcanti | H04W 74/06 |
| 2022/0330270 A1* | 10/2022 | Das | H04W 72/0446 |
| 2022/0338147 A1* | 10/2022 | Cavalcanti | H04L 1/1657 |
| 2022/0338260 A1* | 10/2022 | Cavalcanti | H04W 74/006 |
| 2022/0400503 A1* | 12/2022 | Cavalcanti | H04W 72/1268 |
| 2023/0362996 A1* | 11/2023 | Cao | H04B 7/15528 |
| 2024/0015787 A1* | 1/2024 | Pettersson | H04L 5/0082 |
| 2025/0081034 A1* | 3/2025 | Yu | H04W 28/0289 |

* cited by examiner

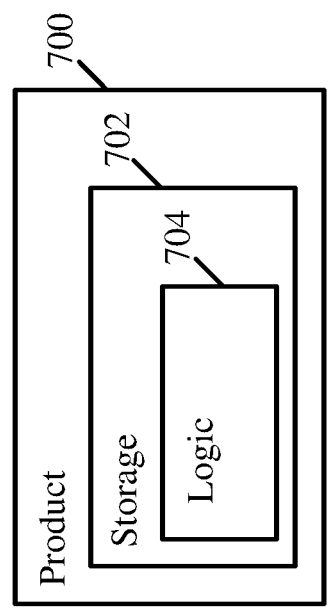

APPARATUS, SYSTEM, AND METHOD OF COMMUNICATION DURING A SYNCHRONIZED TRANSMIT OPPORTUNITY (S-TxOP)

TECHNICAL FIELD

Embodiments described herein generally relate to communication during a Synchronized Transmit Opportunity (S-TxOP).

BACKGROUND

Devices in a wireless communication system may be configured to utilize communication within a Transmit Opportunity (TxOP). For example, a wireless communication station may obtain a TxOP, which may be used by the wireless communication station for communication with one or more other devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 7 is a schematic illustration of a product of manufacture, in accordance with some demonstrative embodiments.

DETAILED DESCRIPTION

Figure 1:
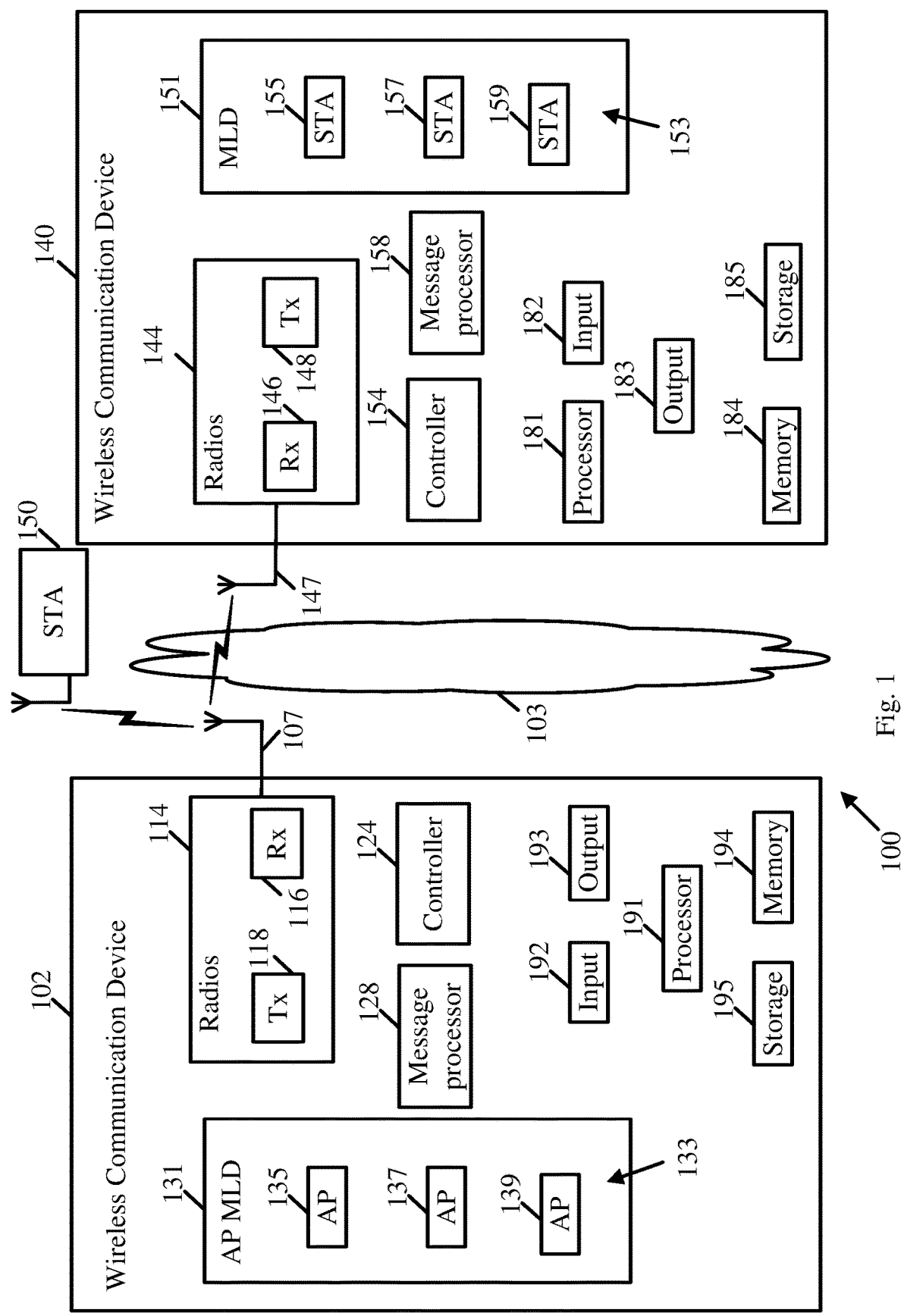
FIG. 1 is a schematic block diagram illustration of a system, in accordance with some demonstrative embodiments.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing IEEE 802.11 standards (including IEEE 802.11-2020 (IEEE 802.11-2020, IEEE Standard for Information Technology—Telecommunications and Information Exchange between Systems Local and Metropolitan Area Networks—Specific Requirements; Part 11: Wireless LAN Medium Access Control (MAC) and Physical Layer (PHY) Specifications, December, 2020); and/or IEEE 802.11be (IEEE P802.11be/D1.5 Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely high throughput (EHT), March 2022)) and/or future versions and/or derivatives thereof, devices and/or networks operating in accordance with existing cellular specifications and/or protocols, and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), 4G, Fifth Generation (5G), or Sixth Generation (6G) mobile networks, 3GPP, Long Term Evolution (LTE), LTE advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that may be integrated with a computer, or a peripheral that may be attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated or group), and/or memory (shared. Dedicated, or group), that execute one or more software or firmware programs, a combinational logic circuit, and/or other suitable hardware components that provide the described functionality. In some aspects, some functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a sub-10 Gigahertz (GHz) frequency band, for example, a 2.4 GHz frequency band, a 5 GHz frequency band, a 6 GHz frequency band, and/or any other frequency band below 10 GHz.

Some demonstrative aspects may be used in conjunction with a wireless communication network communicating over an Extremely High Frequency (EHF) band (also referred to as the "millimeter wave (mmWave)" frequency band), for example, a frequency band within the frequency band of between 20 Ghz and 300 GHz, for example, a frequency band above 45 GHz, e.g., a 60 GHz frequency band, and/or any other mmWave frequency band.

Some demonstrative aspects may be used in conjunction with a wireless communication network communicating over the sub-10 GHz frequency band and/or the mmWave frequency band, e.g., as described below. However, other aspects may be implemented utilizing any other suitable wireless communication frequency bands, for example, a 5G frequency band, a frequency band below 20 GHz, a Sub 1 GHz (S1G) band, a WLAN frequency band, a WPAN frequency band, and the like.

Some demonstrative aspects may be implemented by a mmWave STA (mSTA), which may include for example, a STA having a radio transmitter, which is capable of operating on a channel that is within the mmWave frequency band.

In one example, mmWave communications may involve one or more directional links to communicate at a rate of multiple gigabits per second, for example, at least 1 Gigabit per second, e.g., at least 7 Gigabit per second, at least 30 Gigabit per second, or any other rate.

In some demonstrative aspects, the mmWave STA may include a Directional Multi-Gigabit (DMG) STA, which may be configured to communicate over a DMG frequency band. For example, the DMG band may include a frequency band wherein the channel starting frequency is above 45 GHz.

In some demonstrative aspects, the mmWave STA may include an Enhanced DMG (EDMG) STA, which may be configured to implement one or more mechanisms, which may be configured to enable Single User (SU) and/or Multi-User (MU) communication of Downlink (DL) and/or Uplink frames (UL) using a MIMO scheme. For example, the EDMG STA may be configured to implement one or more channel bonding mechanisms, which may, for example, support communication over a channel bandwidth (BW) (also referred to as a "wide channel", an "EDMG channel", or a "bonded channel") including two or more channels, e.g., two or more 2.16 GHz channels. For example, the channel bonding mechanisms may include, for example, a mechanism and/or an operation whereby two or more channels, e.g., 2.16 GHz channels, can be combined, e.g., for a higher bandwidth of packet transmission, for example, to enable achieving higher data rates, e.g., when compared to transmissions over a single channel. Some demonstrative aspects are described herein with respect to communication over a channel BW including two or more 2.16 GHz channels, however other aspects may be implemented with respect to communications over a channel bandwidth, e.g., a "wide" channel, including or formed by any other number of two or more channels, for example, an aggregated channel including an aggregation of two or more channels. For example, the EDMG STA may be configured to implement one or more channel bonding mechanisms, which may, for example, support an increased channel bandwidth, for example, a channel BW of 4.32 GHz, a channel BW of 6.48 GHz, a channel BW of 8.64 GHz, and/or any other additional or alternative channel BW. The EDMG STA may perform other additional or alternative functionality.

In other aspects, the mmWave STA may include any other type of STA and/or may perform other additional or alternative functionality. Other aspects may be implemented by any other apparatus, device and/or station.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Reference is made to FIG. 1, which schematically illustrates a system 100, in accordance with some demonstrative aspects.

As shown in FIG. 1, in some demonstrative aspects, system 100 may include one or more wireless communication devices. For example, system 100 may include a wireless communication device 102, a wireless communication device 140, a wireless communication device 150, and/or one or more other devices.

In some demonstrative aspects, devices 102, 140 and/or 150 may include a mobile device or a non-mobile, e.g., a static, device.

For example, devices 102, 140 and/or 150 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative aspects, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative aspects, some or all of the components of one or more of devices 102 and/or 140 may be enclosed in a common housing or packaging, and may be interconnected or operably associated using one or more wired or wireless links. In other aspects, components of one or more of devices 102 and/or 140 may be distributed among multiple or separate devices.

In some demonstrative aspects, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative aspects, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative aspects, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative aspects, wireless communication devices 102, 140, and/or 150 may be capable of communicating content, data, information and/or signals via a wireless medium (WM) 103. In some demonstrative aspects, wireless medium 103 may include, for example, a radio channel, an RF channel, a WiFi channel, a cellular channel, a 5G channel, an IR channel, a Bluetooth (BT) channel, a Global Navigation Satellite System (GNSS) Channel, and the like.

In some demonstrative aspects, WM 103 may include one or more wireless communication frequency bands and/or channels. For example, WM 103 may include one or more channels in a sub-10 Ghz wireless communication frequency band, for example, a 2.4 GHz wireless communication frequency band, one or more channels in a 5 GHz wireless communication frequency band, and/or one or more channels in a 6 GHz wireless communication frequency band. In another example, WM 103 may additionally or alternative include one or more channels in a mmWave wireless communication frequency band.

In other aspects, WM 103 may include any other type of channel over any other frequency band.

In some demonstrative aspects, device 102, device 140, and/or device 150 may include one or more radios including circuitry and/or logic to perform wireless communication between devices 102, 140, 150 and/or one or more other wireless communication devices. For example, device 102 may include one or more radios 114, and/or device 140 may include one or more radios 144.

In some demonstrative aspects, radio 114 may include at least a first radio 119, and a second radio 120. For example, radio 119 may be configured to communicate over a first wireless communication channel, and/or radio 120 may be configured to communicate over a second wireless communication channel, e.g., as described below.

In some demonstrative aspects, radio 144 may include at least a first radio 147, and a second radio 149. For example, radio 147 may be configured to communicate over the first wireless communication channel, and/or radio 149 may be configured to communicate over the second wireless communication channel, e.g., as described below.

In some demonstrative aspects, radios 114 and/or 144 may include one or more wireless receivers (Rx) including circuitry and/or logic to receive wireless communication signals, RF signals, frames, blocks, transmission streams, packets, messages, data items, and/or data. For example, a radio 114 may include at least one receiver 116, and/or a radio 144 may include at least one receiver 146.

In some demonstrative aspects, radios 114 and/or 144 may include one or more wireless transmitters (Tx) including circuitry and/or logic to transmit wireless communication signals, RF signals, frames, blocks, transmission streams, packets, messages, data items, and/or data. For example, a radio 114 may include at least one transmitter 118, and/or a radio 144 may include at least one transmitter 148.

In some demonstrative aspects, radios 114 and/or 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radios 114 and/or 144 may include or may be implemented as part of a wireless Network Interface Card (NIC), and the like.

In some demonstrative aspects, radios 114 and/or 144 may be configured to communicate over a 2.4 GHz band, a 5 GHz band, a 6 GHz band, and/or any other band, for example, a directional band, e.g., an mmWave band, a 5G band, an S1G band, and/or any other band.

In some demonstrative aspects, radios 114 and/or 144 may include, or may be associated with one or more, e.g., a plurality of, antennas.

In some demonstrative embodiments, device 102 may include one or more antennas 107, e.g., a single antenna 107 or a plurality of antennas 107, and/or device 140 may include one or more antennas 147, e.g., a single antenna 147 or a plurality of antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. In some aspects, antennas 107 and/or 147 may implement transmit and receive functionalities using separate transmit and receive antenna elements. In some aspects, antennas 107 and/or 147 may implement transmit and receive functionalities using common and/or integrated transmit/receive elements.

In some demonstrative aspects, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, 150 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140, 150 and/or one or more other devices, e.g., as described below.

In some demonstrative aspects, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, at least part of the functionality of controller 124 may be implemented as part of one or more elements of radio 114, and/or at least part of the functionality of controller 154 may be implemented as part of one or more elements of radio 144.

In other aspects, the functionality of controller 124 may be implemented as part of any other element of device 102, and/or the functionality of controller 154 may be implemented as part of any other element of device 140.

In some demonstrative aspects, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative aspects, device 140 may include a message processor 158 configured to generate, process and/or access one or more messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, an MPDU; at least one second component configured to convert the message into a PPDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 158 may be configured to perform any other additional or alternative functionality and/or may include any other additional or alternative components to generate and/or process a message to be transmitted.

In some demonstrative aspects, message processors 128 and/or 158 may include, or may be implemented, partially or entirely, by circuitry and/or logic, e.g., one or more processors including circuitry and/or logic, memory circuitry and/or logic, MAC circuitry and/or logic, PHY circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative aspects, at least part of the functionality of message processor 128 may be implemented as part of radio 114, and/or at least part of the functionality of message processor 158 may be implemented as part of radio 144.

In some demonstrative aspects, at least part of the functionality of message processor 128 may be implemented as part of controller 124, and/or at least part of the functionality of message processor 158 may be implemented as part of controller 154.

In other aspects, the functionality of message processor 128 may be implemented as part of any other element of device 102, and/or the functionality of message processor 158 may be implemented as part of any other element of device 140.

In some demonstrative aspects, at least part of the functionality of controller 124 and/or message processor 128 may be implemented by an integrated circuit, for example, a chip, e.g., a System on Chip (SoC). In one example, the chip or SoC may be configured to perform one or more functionalities of one or more radios 114. For example, the chip or SoC may include one or more elements of controller 124, one or more elements of message processor 128, and/or one or more elements of one or more radios 114. In one example, controller 124, message processor 128, and one or more radios 114 may be implemented as part of the chip or SoC.

In other aspects, controller 124, message processor 128 and/or the one or more radios 114 may be implemented by one or more additional or alternative elements of device 102.

In some demonstrative aspects, at least part of the functionality of controller 154 and/or message processor 158 may be implemented by an integrated circuit, for example, a chip, e.g., a SoC. In one example, the chip or SoC may be configured to perform one or more functionalities of one or more radios 144. For example, the chip or SoC may include one or more elements of controller 154, one or more elements of message processor 158, and/or one or more elements of one or more radios 144. In one example, controller 154, message processor 158, and one or more radios 144 may be implemented as part of the chip or SoC.

In other aspects, controller 154, message processor 158 and/or one or more radios 144 may be implemented by one or more additional or alternative elements of device 140.

In some demonstrative aspects, device 102, device 140, and/or device 150 may include, operate as, perform the role of, and/or perform one or more functionalities of, one or more STAs. For example, device 102 may include at least one STA, device 140 may include at least one STA, and/or device 150 may include at least one STA.

In some demonstrative aspects, device 102, device 140, and/or device 150 may include, operate as, perform the role of, and/or perform one or more functionalities of, one or more Extremely High Throughput (EHT) STAs. For example, device 102 may include, operate as, perform the role of, and/or perform one or more functionalities of, one or more EHT STAs, and/or device 140 may include, operate as, perform the role of, and/or perform one or more functionalities of, one or more EHT STAs.

In other aspects, device 102, device 140, and/or device 150 may include, operate as, perform the role of, and/or perform one or more functionalities of, any other wireless device and/or station, e.g., a WLAN STA, a WiFi STA, and the like.

In some demonstrative aspects, device 102, device 140, and/or device 150 may be configured operate as, perform the role of, and/or perform one or more functionalities of, an access point (AP), e.g., an EHT AP STA.

In some demonstrative aspects, device 102, device 140, and/or device 150 may be configured to operate as, perform the role of, and/or perform one or more functionalities of, a non-AP STA, e.g., an EHT non-AP STA.

In other aspects, device 102, device 140, and/or device 150 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains one station (STA) and provides access to the distribution services, via the wireless medium (WM) for associated STAs. An AP may include a STA and a distribution system access function (DSAF). The AP may perform any other additional or alternative functionality.

In some demonstrative aspects devices 102, 140, and/or 150 may be configured to communicate in an EHT network, and/or any other network.

In some demonstrative aspects, devices 102, 140, and/or 150 may be configured to operate in accordance with one or more Specifications, for example, including one or more IEEE 802.11 Specifications, e.g., an IEEE 802.11-2020 Specification, an IEEE 802.11be Specification, and/or any other specification and/or protocol.

In some demonstrative aspects, device 102, device 140, and/or device 150 may include, operate as, perform a role of, and/or perform the functionality of, one or more multi-link logical entities, e.g., as described below.

In other aspect, device 102, device 140, and/or device 150 may include, operate as, perform a role of, and/or perform the functionality of, any other entities, e.g., which are not multi-link logical entities.

For example, a multi-link logical entity may include a logical entity that contains one or more STAs. The logical entity may have one MAC data service interface and primitives to the logical link control (LLC) and a single address associated with the interface, which can be used to communicate on a distribution system medium (DSM). For example, the DSM may include a medium or set of media used by a distribution system (DS) for communications between APs, mesh gates, and the portal of an extended service set (ESS). For example, the DS may include a system used to interconnect a set of basic service sets (BSSs) and integrated local area networks (LANs) to create an extended service set (ESS). In one example, a multi-link logical entity may allow STAs within the multi-link logical entity to have the same MAC address. The multi-link entity may perform any other additional or alternative functionality.

In some demonstrative aspects, device 102, device 140, and/or device 150 may include, operate as, perform a role of, and/or perform the functionality of, a Multi-Link Device (MLD). For example, device 102 may include, operate as, perform a role of, and/or perform the functionality of, at least one MLD, and/or device 140 may include, operate as, perform a role of, and/or perform the functionality of, at least one MLD, e.g., as described below.

For example, an MLD may include a device that is a logical entity and has more than one affiliated STA and has a single MAC service access point (SAP) to LLC, which includes one MAC data service. The MLD may perform any other additional or alternative functionality.

In some demonstrative aspects, for example, an infrastructure framework may include a multi-link AP logical entity, which includes APs, e.g., on one side, and a multi-link non-AP logical entity, which includes non-APs, e.g., on the other side.

In some demonstrative aspects, device 102, device 140, and/or device 150 may be configured to operate as, perform the role of, and/or perform one or more functionalities of, an AP MLD.

In some demonstrative aspects, device 102, device 140, and/or device 150 may be configured to operate as, perform the role of, and/or perform one or more functionalities of, a non-AP MLD.

In other aspects, device 102, device 140, and/or device 150 may operate as, perform the role of, and/or perform one or more functionalities of, any other additional or alternative device and/or station.

For example, an AP MLD may include an MLD, where each STA affiliated with the MLD is an AP. In one example, the AP MLD may include a multi-link logical entity, where each STA within the multi-link logical entity is an EHT AP. The AP MLD may perform any other additional or alternative functionality.

For example, a non-AP MLD may include an MLD, where each STA affiliated with the MLD is a non-AP STA. In one example, the non-AP MLD may include a multi-link logical entity, where each STA within the multi-link logical entity is a non-AP EHT STA. The non-AP MLD may perform any other additional or alternative functionality.

In one example, a multi-link infrastructure framework may be configured as an extension from a one link operation between two STAs, e.g., an AP and a non-AP STA.

In some demonstrative aspects, controller 124 may be configured to cause, trigger, instruct and/or control device 102 to operate as, perform a role of, and/or perform one or more operations and/or functionalities of, an AP MLD 131 including a plurality of AP STAs 133, e.g., including an AP STA 135, an AP STA 137 and/or an AP STA 139. In some aspects, as shown in FIG. 1, AP MLD 131 may include three AP STAs. In other aspects, AP MLD 131 may include any other number of AP STAs.

In one example, AP STA 135, AP STA 137 and/or AP STA 139 may operate as, perform a role of, and/or perform one or more operations and/or functionalities of, an EHT AP STA. In other aspects, AP STA 135, AP STA 137 and/or AP STA 139 may perform any other additional or alternative functionality.

In some demonstrative aspects, for example, the one or more radios 114 may include, for example, a radio for communication by AP STA 135 over a first wireless communication frequency channel and/or frequency band, e.g., a 2.4 Ghz band, as described below.

In some demonstrative aspects, for example, the one or more radios 114 may include, for example, a radio for communication by AP STA 137 over a second wireless communication frequency channel and/or frequency band, e.g., a 5 Ghz band, as described below.

In some demonstrative aspects, for example, the one or more radios 114 may include, for example, a radio for communication by AP STA 139 over a third wireless communication frequency channel and/or frequency band, e.g., a 6 Ghz band, as described below.

In some demonstrative aspects, the radios 114 utilized by APs 133 may be implemented as separate radios. In other aspects, the radios 114 utilized by APs 133 may be implemented by one or more shared and/or common radios and/or radio components.

In other aspects, controller 124 may be configured to cause, trigger, instruct and/or control device 102 to operate as, perform a role of, and/or perform one or more operations and/or functionalities of, any other additional or alternative entity and/or STA, e.g., a single STA, multiple STAs, and/or a non-MLD entity.

In some demonstrative aspects, controller 154 may be configured to cause, trigger, instruct and/or control device 140 to operate as, perform a role of, and/or perform one or more operations and/or functionalities of, an MLD 151 including a plurality of STAs 153, e.g., including a STA 155, a STA 157 and/or a STA 159. In some aspects, as shown in FIG. 1, MLD 151 may include three STAs. In other aspects, MLD 151 may include any other number of STAs.

In one example, STA 155, STA 157 and/or STA 159 may operate as, perform a role of, and/or perform one or more operations and/or functionalities of, an EHT STA. In other aspects, STA 155, STA 157 and/or STA 159 may perform any other additional or alternative functionality.

In some demonstrative aspects, for example, the one or more radios 144 may include, for example, a radio for communication by STA 155 over a first wireless communication frequency channel and/or frequency band, e.g., a 2.4 Ghz band, as described below.

In some demonstrative aspects, for example, the one or more radios 144 may include, for example, a radio for communication by STA 157 over a second wireless communication frequency channel and/or frequency band, e.g., a 5 Ghz band, as described below.

In some demonstrative aspects, for example, the one or more radios 144 may include, for example, a radio for communication by STA 159 over a third wireless communication frequency channel and/or frequency band, e.g., a 6 Ghz band, as described below.

In some demonstrative aspects, the radios 144 utilized by STAs 153 may be implemented as separate radios. In other aspects, the radios 144 utilized by STAs 153 may be implemented by one or more shared and/or common radios and/or radio components.

In some demonstrative aspects, controller 154 may be configured to cause, trigger, instruct and/or control MLD 151 to operate as, perform a role of, and/or perform one or more operations and/or functionalities of, a non-AP MLD. For example, STA 155, STA 157 and/or STA 159 may operate as, perform a role of, and/or perform one or more operations and/or functionalities of, a non-AP EHT STA.

In some demonstrative aspects, controller 154 may be configured to cause, trigger, instruct and/or control MLD 151 to operate as, perform a role of, and/or perform one or more operations and/or functionalities of, an AP MLD. For example, STA 155, STA 157 and/or STA 159 may operate as, perform a role of, and/or perform one or more operations and/or functionalities of, an AP EHT STA.

In other aspects controller 154 may be configured to cause, trigger, instruct and/or control device 140 to operate as, perform a role of, and/or perform one or more operations and/or functionalities of, any other additional or alternative entity and/or STA, e.g., a single STA, multiple STAs, and/or a non-MLD entity.

Figure 2:
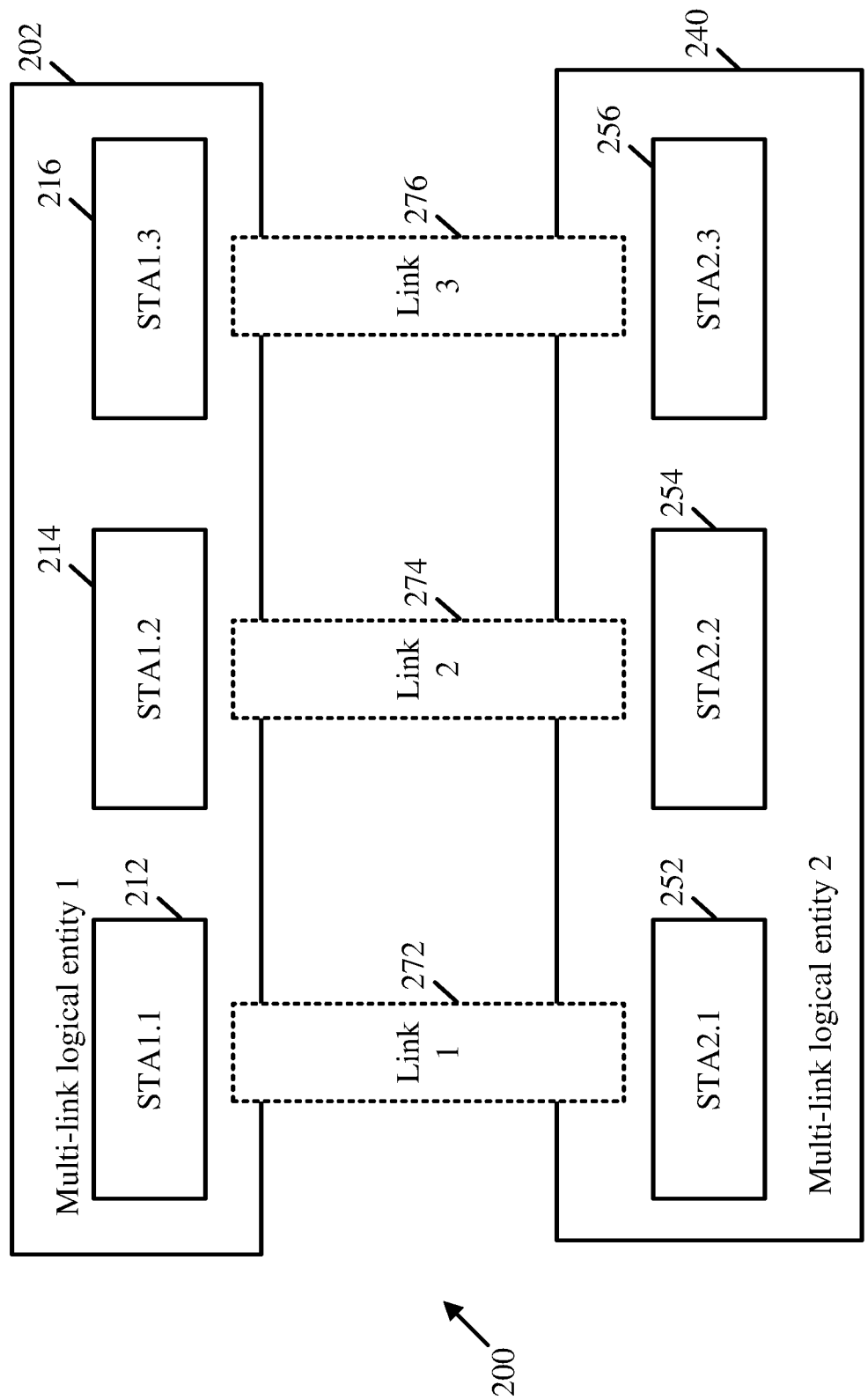
FIG. 2 is a schematic illustration of a multi-link communication scheme, which may be implemented in accordance with some demonstrative aspects.

Reference is made to FIG. 2, which schematically illustrates a multi-link communication scheme 200, which may be implemented in accordance with some demonstrative aspects.

As shown in FIG. 2, a first multi-link logical entity 202 ("multi-link logical entity 1"), e.g., a first MLD, may include a plurality of STAs, e.g., including a STA 212, a STA 214, and a STA 216. In one example, AP MLD 131 (FIG. 1) may perform one or more operations, one or more functionalities, the role of, and/or the functionality of, multi-link logical entity 202.

As shown in FIG. 2, a second multi-link logical entity 240 ("multi-link logical entity 2"), e.g., a second MLD, may include a plurality of STAs, e.g., including a STA 252, a STA 254, and a STA 256. In one example, MLD 151 (FIG. 1) may perform one or more operations, one or more functionalities, the role of, and/or the functionality of, multi-link logical entity 240.

As shown in FIG. 2, multi-link logical entity 202 and multi-link logical entity 240 may be configured to form, setup and/or communicate over a plurality of links, for example, including a link 272 between STA 212 and STA 252, a link 274 between STA 214 and STA 254, and/or a link 276 between STA 216 and STA 256.

Figure 3:
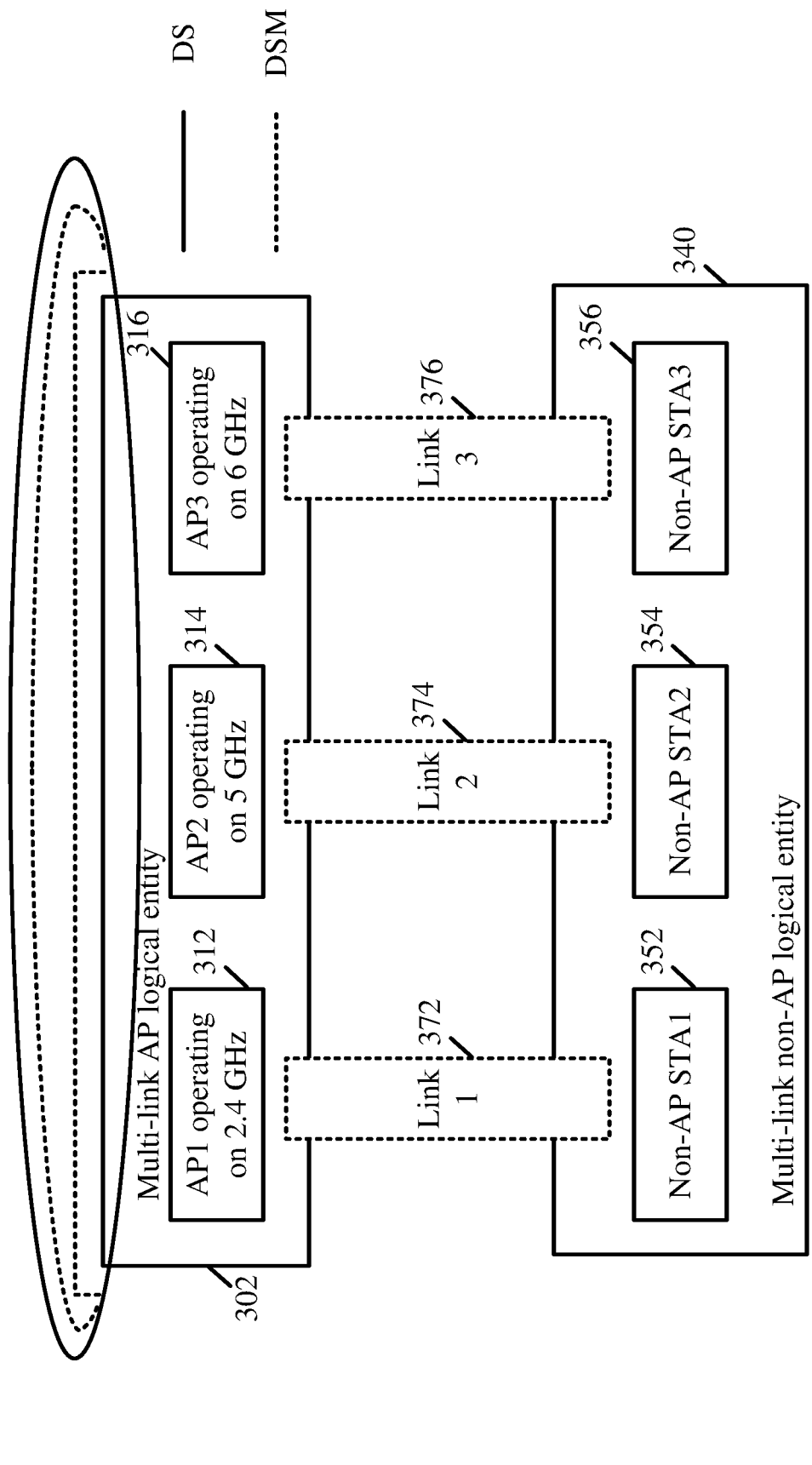
FIG. 3 is a schematic illustration of a multi-link communication scheme, which may be implemented in accordance with some demonstrative aspects.

Reference is made to FIG. 3, which schematically illustrates a multi-link communication scheme 300, which may be implemented in accordance with some demonstrative aspects.

As shown in FIG. 3, a multi-link AP logical entity 302, e.g., an AP MLD, may include a plurality of AP STAs, e.g., including an AP STA 312, an AP STA 314, and an AP STA 316. In one example, AP MLD 131 (FIG. 1) may perform one or more operations, one or more functionalities, the role of, and/or the functionality of, multi-link AP logical entity 302.

As shown in FIG. 3, a multi-link non-AP logical entity 340, e.g., a non-AP MLD, may include a plurality of non-AP STAs, e.g., including a non-AP STA 352, a non-AP STA 354, and a non-AP STA 356. In one example, MLD 151 (FIG. 1) may perform one or more operations, one or more functionalities, the role of, and/or the functionality of, multi-link non-AP logical entity 340.

As shown in FIG. 3, multi-link AP logical entity 302 and multi-link non-AP logical entity 340 may be configured to form, setup and/or communicate over a plurality of links, for example, including a link 372 between AP STA 312 and non-AP STA 352, a link 374 between AP STA 314 and non-AP STA 354, and/or a link 376 between AP STA 316 and non-AP STA 356.

For example, as shown in FIG. 3, multi-link AP logical entity 302 may include a multi-band AP MLD, which may be configured to communicate over a plurality of wireless communication frequency bands. For example, as shown in FIG. 3, AP STA 312 may be configured to communicate over a 2.4 Ghz frequency band, AP STA 314 may be configured to communicate over a 5 Ghz frequency band, and/or AP STA 316 may be configured to communicate over a 6 Ghz frequency band. In other aspects, AP STA 312, AP STA 314, and/or AP STA 316, may be configured to communicate over any other additional or alternative wireless communication frequency bands.

Referring back to FIG. 1, in some demonstrative aspects, devices 102 and/or 140 may be configured to support wireless communication according to a Synchronized Transmit Opportunity (S-TxOP) mechanism, e.g., as described below.

In some demonstrative aspects, the S-TxOP mechanism may be configured to provide a technical solution to support ultra-low latency communication within a TxOP obtained by an AP.

In some demonstrative aspects, an S-TxOP may be configured to provide a technical solution to support Downlink (DL) and/or Uplink (UL) data communication, for example, with a low control overhead.

In some demonstrative aspects, one or more communications during the S-TxOP may be configured to utilize a preamble format, which may be configured to support a technical solution for optimizing a preamble length, for example, to support low control overhead during the S-TxOP, e.g., as described below.

In some demonstrative aspects, one or more communications during the S-TxOP may be configured to utilize a resource allocation signaling mechanism, which may be configured to support a technical solution, for example, to support low control overhead during the S-TxOP, e.g., as described below.

In some demonstrative aspects, one or more communications during the S-TxOP may be configured to utilize an acknowledgement scheme, which may be configured to support a technical solution for supporting a lightweight acknowledgement, for example, to support low control overhead during the S-TxOP, e.g., as described below.

Figure 4:
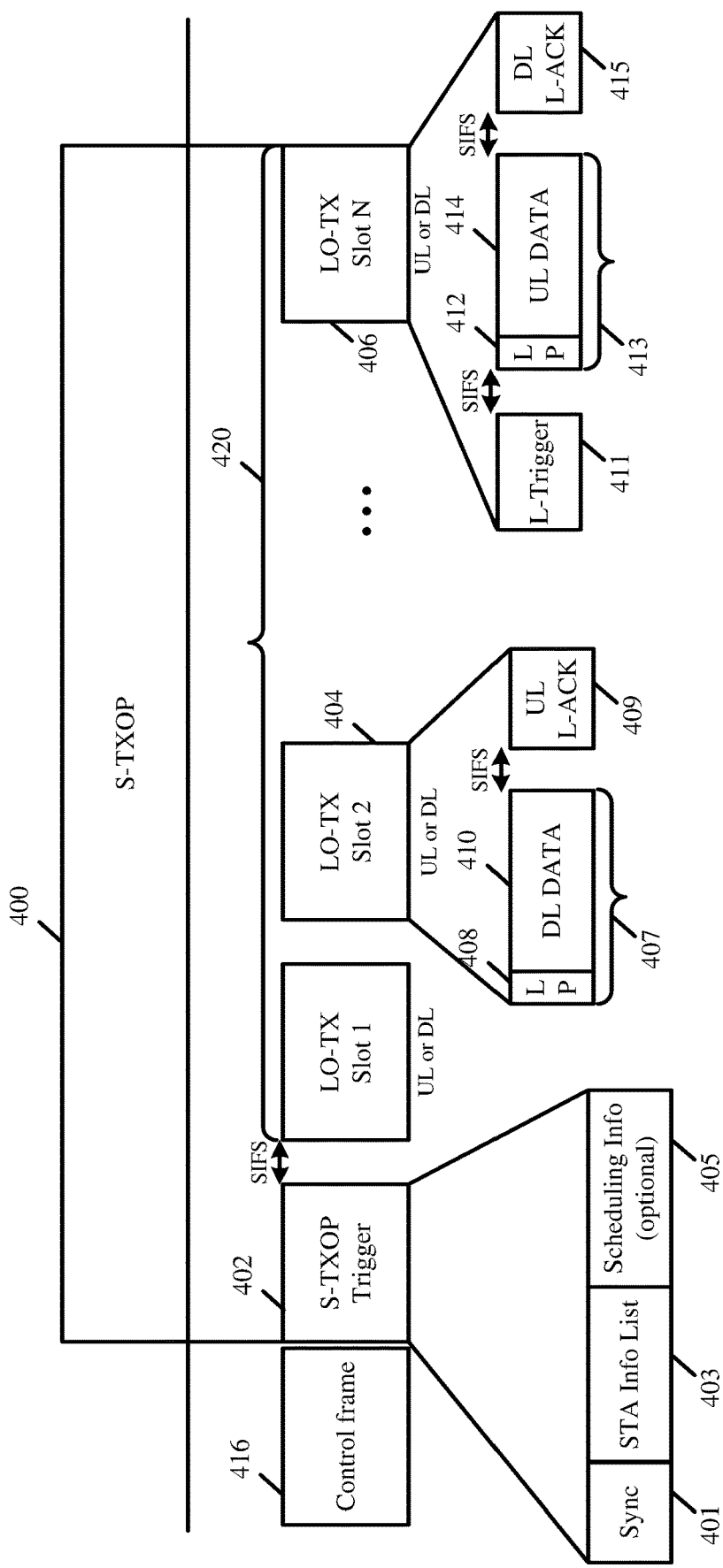
FIG. 4 is a schematic illustration of wireless communication during a Synchronized Transmit Opportunity (S-TxOP), in accordance with some demonstrative embodiments.

Reference is made to FIG. 4, which schematically illustrates communications during an S-TxOP 400, which may be implemented in accordance with some demonstrative aspects.

In some demonstrative aspects, an AP, e.g., an AP implemented by device 102 (FIG. 1), may be configured to communicate with one or more STAs, e.g., a STA implemented by device 140 (FIG. 1), over a wireless communication channel during the S-TxOP 400, e.g., as described below.

In some demonstrative aspects, as shown in FIG. 4, the S-TxOP 400 may be configured to include an S-TXOP trigger phase, during which one or more Physical layer Protocol Data Units (PPDUs) and/or frames may be communicated by the AP and the one or more STAs participating in the S-TxOP 400.

For example, the one or more PPDUs and/or frames communicated during the S-TXOP trigger phase may be configured to support synchronization between one or more STAs participating in the S-TXOP 400 to synchronize to the AP.

For example, the one or more PPDUs and/or frames communicated during the S-TXOP trigger phase may be configured to support the AP in signaling to the to one or more STAs participating in the S-TXOP 400 which slots are scheduled to which STAs for communication during the S-TXOP 400.

For example, the one or more PPDUs and/or frames communicated during the S-TXOP trigger phase may be configured to support the AP in signaling to the to one or more STAs participating in the S-TXOP 400 resource allocations corresponding to the slots scheduled for communication during the S-TXOP 400.

In some demonstrative aspects, as shown in FIG. 4, an AP, e.g., the implemented by device 102 (FIG. 1), may be configured to transmit an S-TxOP trigger frame 402, for example, during the S-TXOP Trigger phase, e.g., as described below.

In some demonstrative aspects, as shown in FIG. 4, the AP, e.g., the AP implemented by device 102 (FIG. 1), may be configured to communicate the S-TxOP trigger frame 402 with one or more STAs, e.g., including the STA implemented by device 140 (FIG. 1), for example, to initiate the S-TxOP 400, e.g., as described below.

In some demonstrative aspects, as shown in FIG. 4, the S-TxOP trigger frame 402 may include a sync field 401, for example, to synchronize one or more STAs to the AP. For example, the sync field 401 may include synchronization information to synchronize the STA implemented by device 140 (FIG. 1) to the AP implemented by device 102 (FIG. 1).

In some demonstrative aspects, as shown in FIG. 4, the S-TxOP trigger frame 402 may include a STA Info list field 403. For example, the STA Info list field 403 may include information regarding the one or more STAs to participate in the S-TxOP 400.

In some demonstrative aspects, as shown in FIG. 4, the S-TxOP trigger frame 402 may include a scheduling information field 405. For example, the scheduling information field 405 may include transmit configuration information regarding transmission slots to be scheduled during the S-TxOP 400.

In some demonstrative aspects, as shown in FIG. 4, the S-TxOP 400 may include a plurality of low-overhead (LO) transmission (Tx) (LO-Tx) slots 420, e.g., as described below. For example, the S-TxOP trigger frame 402 may be configured to schedule the LO-Tx slots 420.

In some demonstrative aspects, the plurality of LO transmission slots 420 may be synchronized, for example, based on the S-TxOP trigger frame 402, e.g., as described below.

In some demonstrative aspects, as shown in FIG. 4, two consecutive LO-Tx slots 420, e.g., each pair of consecutive LO-Tx slots 420, may be separated by a Short Interframe Space (SIFS) from one another.

In some demonstrative aspects, as shown in FIG. 4, the LO-Tx slots 420 may include one or more DL LO-Tx slots, which may be scheduled for DL transmissions, for example, from the AP to the one or more STAs.

In some demonstrative aspects, as shown in FIG. 4, the LO-Tx slots 420 may include one or more UL LO-Tx slots, which may be scheduled for UL transmissions, for example, the one or more STAs to the AP.

In some demonstrative aspects, as shown in FIG. 4, the AP, e.g., the AP implemented by device 102 (FIG. 1), may be configured to transmit at least one LO DL PPDU 407, for example, during a DL LO-Tx slot 404 of the plurality of LO-Tx slots 420, e.g., as described below.

For example, the AP, e.g., the AP implemented by device 102, (FIG. 1), may be configured to transmit the LO DL PPDU 407 to one or more STAs, e.g., including the STA implemented by device 140 (FIG. 1).

In some demonstrative aspects, as shown in FIG. 4, the LO DL PPDU 407 may include a low-overhead preamble (LP) (also referred to as "lite preamble") 408, and a DL Data field 410, e.g., as described below.

In some demonstrative aspects, the LP 408 may be configured to indicate a length of the LO DL PPDU 407, e.g., as described below.

In some demonstrative aspects, as shown in FIG. 4, a STA addressed by the LO DL PPDU 407, e.g., the STA implemented by device 140 (FIG. 1), may be configured to transmit to the AP an UL acknowledgement (ACK) frame 409, for example, during the LO-Tx slot 404, e.g., as described below.

For example, the UL ACK frame 409 may be configured to acknowledge receipt of the LO DL PPDU 407 by the STA.

In some demonstrative aspects, as shown in FIG. 4, the UL ACK frame 409 may be after the LO DL PPDU 407, for example, no more than a SIFS after the LO DL PPDU 407.

In some demonstrative aspects, as shown in FIG. 4, a STA participating in the S-TxOP 400, e.g., the STA implemented by device 140 (FIG. 1), may be configured to transmit a LO UL PPDU 413 to the AP, for example, during a LO-Tx slot 406 of the plurality of LO transmission slots 420, e.g., as described below.

For example, the AP implemented by device 102 (FIG. 1) may be configured to receive the LO UL PPDU 413 from the STA implemented by device 140 (FIG. 1).

In some demonstrative aspects, as shown in FIG. 4, the AP implemented by device 102 (FIG. 1) may be configured to transmit a low overhead trigger (also referred to as "lite trigger") (L-Trigger) frame 411 during the LO transmission slot 406, for example, to trigger transmission of the LO UL PPDU 413, e.g., as described below.

For example, the AP implemented by device 102 (FIG. 1) may be configured to transmit L-Trigger frame 411 to trigger the transmission of the LO UL PPDU 413 from the STA implemented by device 140 (FIG. 1).

In some demonstrative aspects, as shown in FIG. 4, the LO UL PPDU 413 may include an LP 412, and an UL Data field 414, e.g., as described below.

In some demonstrative aspects, as shown in FIG. 4, the LO UL PPDU 413 may be after the L-Trigger frame 411, for example, no more than a SIFS after the L-Trigger frame 411.

In some demonstrative aspects, the LP 412 may be configured to indicate a length of the LO UL PPDU 413, e.g., as described below.

In some demonstrative aspects, as shown in FIG. 4, the AP, e.g., the AP implemented by device 102 (FIG. 1), may be configured to transmit to the STA a DL ACK frame 415, for example, during the LO-Tx slot 406, e.g., as described below.

For example, the DL ACK frame 415 may be configured to acknowledge receipt of the LO UL PPDU 413 by the AP.

In some demonstrative aspects, as shown in FIG. 4, the DL ACK frame 415 may be after the LO UL PPDU 413, for example, no more than a SIFS after the LO UL PPDU 413.

Referring back to FIG. 1, in some demonstrative aspects, device 102 and/or device 140 may be configured to implement a protection mechanism to protect communications during an S-TxOP, for example, during the TxOP 400 (FIG. 4), e.g., as described below.

In some demonstrative aspects, the protection mechanism may be configured to provide a technical solution to protect communications during the S-TxOP from one or more STAs, e.g., legacy STAs, which may not be capable of decoding the communications during the S-TxOP, e.g., as described below.

In some demonstrative aspects, STAs of a first STA type, e.g., the legacy STAs, for example, STA 150, may be capable of decoding PPDUs of a first PPDU version, for example, according to a first wireless communication protocol and/or standard.

In some demonstrative aspects, STAs of a second STA type, e.g., the STAs implemented by device 102 and/or device 140, may be configured to communicate PPDUs of a second version, for example, during an S-TxOP, e.g., the S-TxOP 400 (FIG. 4).

In some demonstrative aspects, the STAs of the second STA type, e.g., the STAs implemented by device 102 and/or device 140, may be configured to communicate PPDUs of the second version, for example, according to a second wireless communication protocol and/or standard.

In some demonstrative aspects, STAs of the first STA type, e.g., the legacy STAs, for example, STA 150, may not be capable of decoding the PPDUs of the second version. For example, the STAs of the first STA type, e.g., the legacy STAs, for example, STA 150, may not support communications according to the second wireless communication protocol and/or standard.

In some demonstrative aspects, the STAs of the second STA type, e.g., the STAs implemented by device 102 and/or device 140, may be configured to communicate PPDUs of the second version, for example, including low-overhead PPDUs, which may be decodable by STAs of the second STA type, e.g., as described below.

In some demonstrative aspects, devices 102 and/or 140 may be configured to communicate low-overhead PPDUs, for example, during a S-TxOP, e.g., as described below.

In some demonstrative aspects, the low-overhead PPDUs may include a low-overhead preamble, which may be configured to exclude one or more preamble fields of the first PPDU version, e.g., as described below.

For example, the LP 408 (FIG. 4) and/or the LP 412 (FIG. 4) may be configured as low-overhead preambles excluding one or more preamble fields of the first PPDU version, e.g., as described below.

In some demonstrative aspects, for example, legacy STAs, e.g., the STA 150, may not be able to decode the presence of a WiFi signal and defer accordingly during a S-TXOP, for example, if a legacy preamble part is not present in a PPDU communicated during the S-TxOP.

In some demonstrative aspects, device 102 and/or device 140 may be configured to implement a protection mechanism, which may be configured to protect communications during the S-TxOP, for example, by signaling to legacy STAs that communications by the legacy STAs are to be deferred, e.g., as described below.

In some demonstrative aspects, the protection mechanism may be configured to provide a technical solution to define rules for the legacy STAs' behavior, for example, to signal to the legacy STAs to defer properly during the S-TXOP, e.g., as described below.

In some demonstrative aspects, the protection mechanism may be configured to provide a technical solution to indicate to the legacy STAs to set their Network Allocation Vectors (NAV), for example, from PPDUs exchanged during an S-TXOP Trigger phase, or a-priori, e.g., as described below.

In some demonstrative aspects, frames transmitted at the beginning part of an S-TXOP, e.g., frames transmitted by device 102 and/or device 140, may be configured to set a NAV for legacy STAs, for example, such that the legacy STAs are to defer during the rest of the S-TxOP, e.g., as described below.

In some demonstrative aspects, an AP, e.g., the AP implemented by device 102, may be configured to transmit and/or solicit one of more frames during the S-TxOP, for example, to provide more protection, for example, during the rest of the S-TXOP, e.g., as described below.

In some demonstrative aspects, the AP, e.g., the AP implemented by device 102, may be configured to transmit and/or solicit one or more frames according to the first PPDU version, e.g., a legacy-compatible PPDU, for example, to signal to the legacy STAs that the NAV also is to be set later, e.g., as described below.

In some demonstrative aspects, an S-TxOP trigger phase, e.g., the S-TxOP trigger phase of S-TxOP 400 (FIG. 4), may be configured to include an exchange of PPDUs in a non-High Throughput (non-HT) duplicate format. In one example, device 110 and/or device 140 may be configured to communicate PPDUS, e.g., the S-TxOP trigger frame 402 (FIG. 4) and/or any other frame of the S-TxOP trigger phase, in the non-HT duplicate format, for example, during the S-TxOP trigger phase of S-TxOP 400 (FIG. 4). For example, the exchange of PPDUs in the non-HT duplicate format may allow a legacy STA, e.g., the STA 150, to set the NAV for a remaining duration of the S-TXOP.

In some demonstrative aspects, for example, the exchange of PPDUs in the non-HT duplicate format may include a Multi User (MU)-Request to Send (RTS) and Clear to Send (CTS) exchange. In other aspects, the exchange of PPDUs in the non-HT duplicate format may include any other type of PPDUs.

In some demonstrative aspects, a PPDU communicated in the S-TxOP trigger phase, e.g., the S-TxOP trigger phase of S-TxOP 400 (FIG. 4), may be transmitted, for example, in an HT PPDU format, and may be configured to indicate a Resource Allocation (RA) for the S-TxOP.

In some demonstrative aspects, a non-HT Signal (L-SIG) field of the HT PPDU may be configured to carry a length of the rest of the S-TxOP duration.

In some demonstrative aspects, a HT Signal (HT-SIG) field of the HT PPDU may be configured to include a length of the HT PPDU itself.

In some demonstrative aspects, device 102 and/or device 140 may be configured to implement a lightweight acknowledgement scheme, which may be configured, for example, to provide a technical solution to improve reliability of communications during an S-TxOP, e.g., as described below.

In some demonstrative aspects, a short preamble based acknowledgement scheme may be utilized for communications during an S-TxOP. However, in some scenarios and/or use cases, a lightweight acknowledgement may be more reliable.

In some demonstrative aspects, devices 102 and/or 140 may be configured to implement a short MAC based acknowledgement scheme, which may be configured to provide a technical solution to improve reliability, for example, over a Null-Data-Packet (NDP) based ACK, e.g., as described below.

In some demonstrative aspects, devices 102 and/or 140 may be configured to communicate a short MAC ACK frame, for example, to acknowledge communication of a low-overhead PPDU, for example, during a S-TxOP, e.g., as described below.

In some demonstrative aspects, device 102 and/or device 140 may be configured to communicate an acknowledgement during an S-TxOP, e.g., an acknowledgement to a DL PPDU frame and/or an acknowledgement to an UL PPDU frame, in the form of an ACK carried by a short MAC frame, e.g., as described below.

In some demonstrative aspects, the short MAC ACK frame may be shorter than a Block ACK (BA) frame and/or an Ack frame, which may be used outside the S-TxOP, e.g., as described below.

In some demonstrative aspects, the short MAC ACK frame may be configured to exclude one or more fields of an ACK frame outside the S-TxOP, e.g., as described below.

In some demonstrative aspects, the short MAC ACK frame may be configured to exclude at least one of a duration field and/or a Receiver Address (RA) field, e.g., as described below.

In some demonstrative aspects, the short MAC ACK frame may be configured as a MAC frame carrying a one bit Acknowledgement, and may include, for example, some or all of the following information, e.g., only the following information:

Frame Control: to signal the type of the short MAC ACK frame.

Frame Check Sequence (FCS): for error detection, e.g., the FCS may be 4 bytes or less bytes. In other aspects, the FCS may have any other length.

In some demonstrative aspects, the short MAC ACK frame may include a short MAC Block Ack (BACK) frame, which may include, for example, some or all of the following information, e.g., only the following information:

Frame Control: to signal the type of the short MAC ACK frame.

Starting Sequence Number, e.g., 12 bits, or any other length.

Short bitmap, e.g., including a bitmap of N octets. For example, N may be much smaller than 8 octets, e.g., 1 octet. In other aspects, Na may have any other value.

FCS for error detection e.g., including 4 bytes or less. In other aspects, the FCS may have any other length.

In some demonstrative aspects, the short MAC ACK frame may include a short BACK frame, which may include, for example, some or all of the following information, e.g., only the following information:
Frame Control to signal the type of the short MAC ACK frame.
Short bitmap, e.g., including a bitmap of N octets. For example, N may be much smaller than 8 octets, e.g., 1 octet. In other aspects, Na may have any other value.
An absence of a sequence control field may indicate an implicit acknowledgement of frames in a last received Aggregate MPDU (AMPDU) by the STA transmitting the short MAC ACK frame.
FCS for error detection e.g., including 4 bytes or less. In other aspects, the FCS may have any other length.

In some demonstrative aspects, device 102 and/or device 140 may be configured to communicate a low-overhead PPDU, which may be configured to indicate a length of the low-overhead PPDU, e.g., as described below.

For example, for some PPDU types, for example, an EHT PPDU, a length of the PPDU may be obtained from a length field in a non-HT (legacy) preamble part of the PPDU, e.g., in an L-SIG field of the PPDU.

In some demonstrative aspects, device 102 and/or device 140 may be configured to communicate a low-overhead PPDU, which may be configured to indicate a length of the low-overhead PPDU, for example, even in case that the low-overhead PPDU excludes one or more fields of a non-HT (legacy) preamble part, e.g., the L-SIG field, as described below.

In some demonstrative aspects, a low-overhead preamble, e.g., a lite preamble, of a low-overhead PPDU, e.g., communicated in a DL slot or an UL slot of a S-TxOP, may be configured to indicate a length of the low-overhead PPDU, e.g., as described below.

In some demonstrative aspects, a low-overhead preamble, e.g., a lite preamble, of a low-overhead PPDU may be configured to provide a technical solution to support STAs in parsing a length of the low-overhead PPDU, e.g., as described below.

In some demonstrative aspects, device 102 and/or device 140 may be configured to communicate a low-overhead PPDU, including a lite preamble, which is configured to signal length information corresponding to the length of the low-overhead PPDU, e.g., as described below.

In some demonstrative aspects, device 102 and/or device 140 may be configured to communicate a low-overhead PPDU, including a lite preamble, which may include a signal field, e.g., a unified Signal (U-SIG) field, a U-SIG equivalent field, and/or any other field, which may be configured to indicate the length of the low-overhead PPDU, e.g., as described below.

For example, the length information of the low-overhead PPDU may be contained in a U-SIG field and/or a US-SIG equivalent of a low-overhead preamble, e.g., a lite-preamble, of the low overhead PPDU, for example, when a legacy preamble is not included in the low-overhead PPDU.

In some demonstrative aspects, the length information of the low-overhead PPDU may be contained in place of one or more fields in the U-SIG, which may be excluded from the low-overhead preamble, e.g., as described below.

For example, a Basic Service Set (BSS) Color field and/or a TXOP field may be exclude from a U-SIG and/or a U-SIG equivalent field of the low-overhead preamble. According to this example, these fields may be utilized to carry a field signaling the length information of the remaining part of the PPDU.

In some demonstrative aspects, a Spatial Reuse field may not be present in the U-SIG field and/or a U-SIG equivalent field of the low-overhead preamble of a low-overhead PPDU, for example, when the low-overhead PPDU is sent in an UL transmission. According to this example, this field may be utilized to carry a field signaling the length information of the remaining part of the PPDU.

In some demonstrative aspects, a NAV of the PPDUs may be updated from the length information of the low-overhead PPDU containing the low-overhead preamble, e.g., the lite-preamble.

In some demonstrative aspects, controller 124 may be configured to cause an AP implemented by device 102 to transmit a frame over a wireless communication channel, e.g., as described below.

In some demonstrative aspects, the frame may include a field according to a first PPDU version decodable by a STA of a first STA type, e.g., as described below.

In some demonstrative aspects, the field may be configured to indicate to the STA of the first STA type that the wireless communication channel is to be reserved for a reserved duration, e.g., as described above.

For example, controller 124 may be configured to cause the AP implemented by device 102 to transmit the frame over the wireless communication channel, the frame including the field according to the first PPDU version decodable by a STA of a first STA type implemented be device 150.

In some demonstrative aspects, controller 124 may be configured to cause the AP implemented by device 102 to communicate a low-overhead PPDU with a STA of a second STA type over the wireless communication channel during an S-TxOP, e.g., as described above.

In some demonstrative aspects, the S-TxOP may be within the reserved duration, e.g., as described above.

In some demonstrative aspects, the low-overhead PPDU may be configured according to a second PPDU version decodable by the STA of the second STA type, e.g., as described above.

In some demonstrative aspects, the low overhead PPDU may include a low-overhead preamble excluding one or more preamble fields of the first PPDU version, e.g., as described above.

In some demonstrative aspects, controller 154 may be configured to cause a STA implemented by device 140 to process a frame received from an AP over a wireless communication channel, e.g., as described below.

For example, the STA implemented by device 140 may be configured to process the frame received from the AP implemented by device 102 over the wireless communication channel.

In some demonstrative aspects, controller 154 may be configured to cause the STA implemented by device 140 to communicate a low-overhead PPDU with the AP over the wireless communication channel during a S-TxOP within the reserved period, e.g., as described above.

For example, the AP implemented by device 102 may communicate the low-overhead PPDU with a STA of a second STA type implemented by device 140 over the wireless communication channel during the S-TxOP.

In some demonstrative aspects, the STA of the first STA type may include a legacy STA, e.g., as described above.

In some demonstrative aspects, the STA of the second STA type may include a non-legacy STA, e.g., as described above.

In some demonstrative aspects, the low-overhead preamble may be configured to indicate a length of the low-overhead PPDU, e.g., as described above.

In some demonstrative aspects, a unified Signal (U-SIG) field in the low-overhead preamble may be configured to indicate a length of the low-overhead PPDU, e.g., as described above.

In other aspects, any other additional or alternative field in the low-overhead preamble may be configured to indicate the length of the low-overhead PPDU.

In some demonstrative aspects, controller 124 may be configured to cause the AP implemented by device 102 to transmit the low-overhead PPDU as a DL PPDU to the STA of the second STA type, for example, the STA implemented by device 140, e.g., as described above.

In some demonstrative aspects, controller 124 may be configured to cause the AP implemented by device 102 to process the low-overhead PPDU as an UL PPDU received from the STA of the second STA type, for example, the STA implemented by device 140, e.g., as described above.

In some demonstrative aspects, the frame transmitted by the AP may include an S-TxOP trigger frame to initiate the S-TxOP, e.g., as described above.

For example, the AP implemented by device 102 may transmit the frame including the S-TxOP trigger frame 402 (FIG. 4) to initiate the S-TxOP.

In some demonstrative aspects, the S-TxOP trigger frame may include synchronization information to synchronize one or more STAs of the second STA type to the AP, e.g., as described above.

In some demonstrative aspects, controller 154 may be configured to cause the STA implemented by device 140 to synchronize to the AP, for example, based on synchronization information in the S-TxOP trigger frame from the AP, e.g., as described above.

In some demonstrative aspects, the S-TxOP may include a plurality of transmission slots, which may be, for example, synchronized based on the S-TxOP trigger frame, e.g., as described above.

In some demonstrative aspects, the low-overhead PPDU may be communicated during a transmission slot of the plurality of transmission slots, e.g., as described above.

For example, the AP implemented by device 102 may be configured to communicate the low-overhead PPDU with the STA implemented by device 140 during a transmission slot of the plurality of transmission slots of the S-TxOP 400 (FIG. 4).

In some demonstrative aspects, the frame transmitted by the AP may include a control frame, e.g., as described below.

For example, the frame transmitted by the AP implemented by device 102 may include a control frame 416 (FIG. 4).

In some demonstrative aspects, the control frame may include a Request to Send (RTS) frame, e.g., as described above.

In some demonstrative aspects, controller 124 may be configured to cause the AP implemented by device 102 to communicate during the S-TxOP a PPDU according to the first PPDU version, for example, to set a NAV according to the S-TxOP, e.g., as described above.

In some demonstrative aspects, the first PPDU version may include a non-HT PPDU version decodable by non-HT STAs, e.g., as described above.

In some demonstrative aspects, controller 124 may be configured to cause the AP implemented by device 102 to transmit the frame as a non-HT duplicate format PPDU over a plurality of non-HT channels in the wireless communication channel, e.g., as described above.

In some demonstrative aspects, controller 124 may be configured to cause the AP implemented by device 102 to transmit the frame as an HT PPDU including an L-SIG field, e.g., as described above.

In some demonstrative aspects, the L-SIG field may include a length field, for example, based on a duration of the S-TxOP.

In some demonstrative aspects, the low-overhead preamble may be configured to exclude an L-SIG field.

In some demonstrative aspects, the low-overhead preamble may be configured to exclude a non-HT Short Training Field (L-STF).

In some demonstrative aspects, the low-overhead preamble may be configured to exclude a non-HT Long Training Field (L-LTF).

In other aspects, the low-overhead preamble may be configured to exclude one or more additional or alternative fields of the first PPDU version.

In some demonstrative aspects, controller 124 may be configured to cause the AP implemented by device 102 to communicate a short MAC ACK frame to acknowledge a low-overhead PPDU received by the AP implemented by device 102, e.g., as described above.

In some demonstrative aspects, controller 154 may be configured to cause the STA implemented by device 140 to communicate a short MAC acknowledgement (ACK) frame to acknowledge the low-overhead PPDU received by the STA implemented by device 140, e.g., as described above.

In some demonstrative aspects, the short MAC ACK frame may be configured to exclude one or more fields of an ACK frame outside the S-TxOP, e.g., as described above.

In some demonstrative aspects, the short MAC ACK frame may be configured to exclude a duration field, e.g., as described above.

In some demonstrative aspects, the short MAC ACK frame may be configured to exclude a Receiver Address (RA) field, e.g., as described above.

In some demonstrative aspects, the short MAC ACK frame may be configured to include no more than a frame control field and an FCS field, e.g., as described above.

In some demonstrative aspects, the FCS field may include no more than 4 bytes. In other aspects, the FCS may include any other count of bytes.

In some demonstrative aspects, the short MAC ACK frame may be configured to include a short MAC Block ACK (BACK), e.g., as described above.

In some demonstrative aspects, the short MAC BACK may include a short bitmap corresponding to a plurality of MPDUs, e.g., as described above.

In some demonstrative aspects, the short bitmap may include less than 8 octets. In other aspects, the short bitmap may include any other count of bits.

In some demonstrative aspects, the short MAC BACK may include a starting sequence number, e.g., as described above.

In some demonstrative aspects, controller 124 may be configured to cause the AP implemented by device 102 to set the short MAC BACK to implicitly acknowledge frames in a last received AMPDU, which is received by the AP, for example, by excluding a sequence control field from the short MAC BACK, e.g., as described above.

In some demonstrative aspects, controller 154 may be configured to cause the STA implemented by device 140 to set a short MAC BACK to implicitly acknowledge frames in a last received AMPDU, which is received by the STA, for example, by excluding a sequence control field from the short MAC BACK, e.g., as described above.

Figure 5:
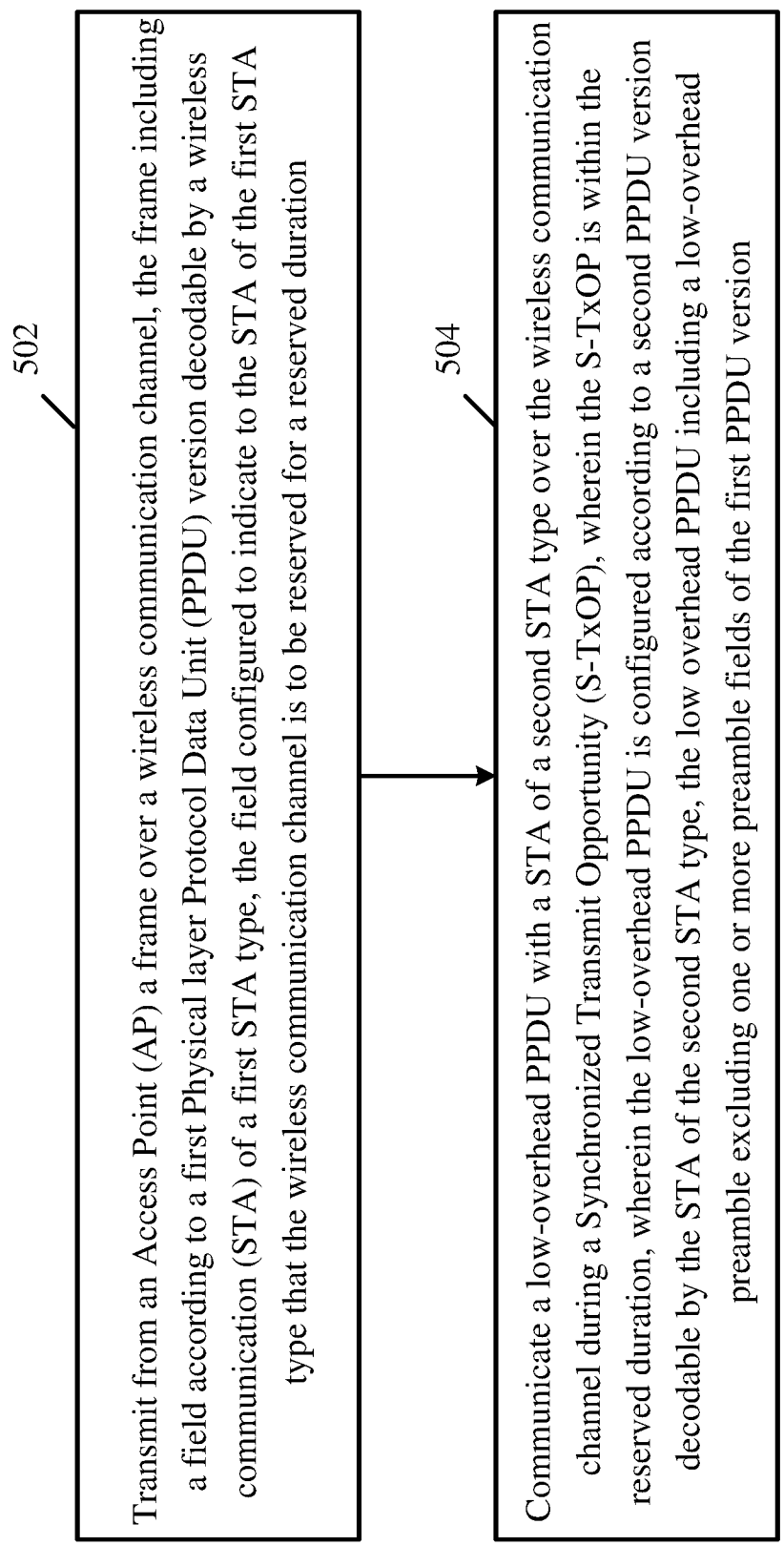
FIG. 5 is a schematic flow-chart illustration of a method of wireless communication during an S-TxOP, in accordance with some demonstrative embodiments.

Reference is made to FIG. 5, which schematically illustrates a method of wireless communication during an S-TxOP, in accordance with some demonstrative embodiments. For example, one or more of the operations of the method of FIG. 5 may be performed by one or more elements of a system, e.g., system 100 (FIG. 1), for example, one or more wireless devices, e.g., device 102 (FIG. 1), and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 502, the method may include transmitting a frame over a wireless communication channel, the frame including a field according to a first PPDU version decodable by a STA of a first STA type, the field configured to indicate to the STA of the first STA type that the wireless communication channel is to be reserved for a reserved duration. For example, controller 124 (FIG. 1) may be configured to cause, trigger, and/or control device 102 (FIG. 1) to transmit the frame over the wireless communication channel, the frame including the field according to the first PPDU version decodable by device 150 (FIG. 1), the field configured to indicate to device 150 (FIG. 1) that the wireless communication channel is to be reserved for a reserved duration, e.g., as described above.

As indicated at block 504, the method may include communicating a low-overhead PPDU with a STA of a second STA type over the wireless communication channel during an S-TxOP, wherein the S-TxOP is within the reserved duration, wherein the low-overhead PPDU is configured according to a second PPDU version decodable by the STA of the second STA type. For example, the low overhead PPDU may be configured to include a low-overhead preamble excluding one or more preamble fields of the first PPDU version. For example, controller 124 (FIG. 1) may be configured to cause, trigger, and/or control device 102 (FIG. 1) to communicate the low-overhead PPDU with device 140 (FIG. 1) over the wireless communication channel during the S-TxOP, e.g., as described above.

Figure 6:
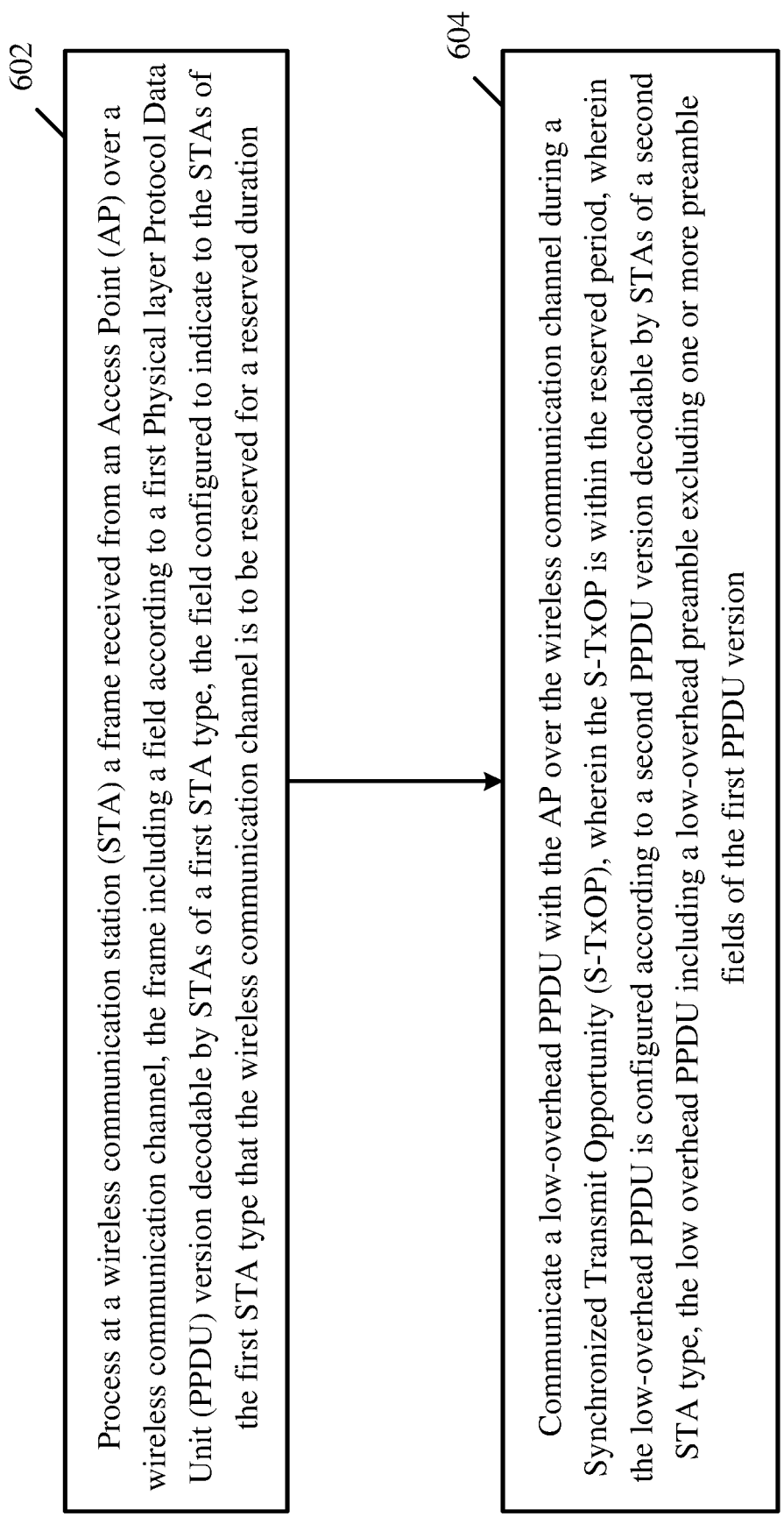
FIG. 6 is a schematic flow-chart illustration of a method of wireless communication during an S-TxOP, in accordance with some demonstrative embodiments.

Reference is made to FIG. 6, which schematically illustrates a method of wireless communication during an S-TxOP, in accordance with some demonstrative embodiments. For example, one or more of the operations of the method of FIG. 11 may be performed by one or more elements of a system, e.g., system 100 (FIG. 1), for example, one or more wireless devices, e.g., device 102 (FIG. 1), and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 602, the method may include processing at a STA a frame received from an AP over a wireless communication channel, the frame including a field according to a first PPDU version decodable by STAs of a first STA type, the field configured to indicate to the STAs of the first STA type that the wireless communication channel is to be reserved for a reserved duration. For example, controller 154 (FIG. 1) may be configured to cause, trigger, and/or control device 140 (FIG. 1) to process the frame received from device 102 (FIG. 1) over the wireless communication channel, e.g., as described above.

As indicated at block 604, the method may include communicating a low-overhead PPDU with the AP over the wireless communication channel during an S-TxOP, wherein the S-TxOP is within the reserved period, wherein the low-overhead PPDU is configured according to a second PPDU version decodable by STAs of a second STA type. For example, the low overhead PPDU may include a low-overhead preamble excluding one or more preamble fields of the first PPDU version. For example, controller 154 (FIG. 1) may be configured to cause, trigger, and/or control device 140 (FIG. 1) to communicate the low-overhead PPDU with device 102 (FIG. 1) over the wireless communication channel during the S-TxOP, e.g., as described above.

Reference is made to FIG. 7, which schematically illustrates a product of manufacture 700, in accordance with some demonstrative aspects. Product 700 may include one or more tangible computer-readable ("machine-readable") non-transitory storage media 702, which may include computer-executable instructions, e.g., implemented by logic 704, operable to, when executed by at least one computer processor, enable the at least one computer processor to implement one or more operations at device 102 (FIG. 1), device 140 (FIG. 1), MLD 131 (FIG. 1), MLD 151 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1), to cause device 102 (FIG. 1), device 140 (FIG. 1), MLD 131 (FIG. 1), MLD 151 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1), to perform, trigger and/or implement one or more operations and/or functionalities, and/or to perform, trigger and/or implement one or more operations and/or functionalities described with reference to the FIGS. 1, 2, 3, 4, 5, and/or 6, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 700 and/or machine-readable storage media 702 may include one or more types of computer-readable storage media capable of storing data, including volatile memory, non-volatile memory, removable or non-removable memory, erasable or non-erasable memory, writeable or re-writeable memory, and the like. For example, machine-readable storage media 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), flash memory (e.g., NOR or NAND flash memory), content addressable memory (CAM), polymer memory, phase-change memory, ferroelectric memory, silicon-oxide-nitride-oxide-silicon (SONOS) memory, a disk, a hard drive, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, machine code, and the like.

EXAMPLES

The following examples pertain to further embodiments.

Example 1 includes an apparatus comprising logic and circuitry configured to cause an Access Point (AP) to transmit a frame over a wireless communication channel, the frame comprising a field according to a first Physical layer Protocol Data Unit (PPDU) version decodable by a wireless communication (STA) of a first STA type, the field configured to indicate to the STA of the first STA type that the wireless communication channel is to be reserved for a reserved duration; and communicate a low-overhead PPDU with a STA of a second STA type over the wireless communication channel during a Synchronized Transmit Opportunity (S-TxOP), wherein the S-TxOP is within the reserved duration, wherein the low-overhead PPDU is configured according to a second PPDU version decodable by the STA of the second STA type, the low overhead PPDU comprising a low-overhead preamble excluding one or more preamble fields of the first PPDU version.

Example 2 includes the subject matter of Example 1, and optionally, wherein the frame comprises an S-TxOP trigger frame to initiate the S-TxOP.

Example 3 includes the subject matter of Example 2, and optionally, wherein the S-TxOP trigger frame comprises synchronization information to synchronize one or more STAs of the second STA type to the AP.

Example 4 includes the subject matter of Example 2 or 3, and optionally, wherein the S-TxOP comprises a plurality of transmission slots synchronized based on the S-TxOP trigger frame, wherein the low-overhead PPDU is communicated during a transmission slot of the plurality of transmission slots.

Example 5 includes the subject matter of any one of Examples 1-4, and optionally, wherein the frame comprises a control frame.

Example 6 includes the subject matter of Example 5, and optionally, wherein the control frame comprises a Request to Send (RTS) frame.

Example 7 includes the subject matter of any one of Examples 1-6, and optionally, wherein the apparatus is configured to cause the AP to communicate during the S-TxOP a PPDU according to the first PPDU version to set a Network Allocation Vector (NAV) according to the S-TxOP.

Example 8 includes the subject matter of any one of Examples 1-7, and optionally, wherein the first PPDU version comprises a non-High Throughput (non-HT) PPDU version decodable by non-HT STAs.

Example 9 includes the subject matter of Example 8, and optionally, wherein the apparatus is configured to cause the AP to transmit the frame as a non-HT duplicate format PPDU over a plurality of non-HT channels in the wireless communication channel.

Example 10 includes the subject matter of Example 8, and optionally, wherein the apparatus is configured to cause the AP to transmit the frame as an HT PPDU comprising a non-HT Signal (L-SIG) field, the L-SIG field comprising a length field based on a duration of the S-TxOP.

Example 11 includes the subject matter of any one of Examples 8-10, and optionally, wherein the low-overhead preamble excludes at least one of a non-HT Signal (L-SIG) field, a non-HT Short Training Field (L-STF), or a non-HT Long Training Field (L-LTF).

Example 12 includes the subject matter of any one of Examples 1-11, and optionally, wherein the apparatus is configured to cause the AP to communicate a short Media Access Control (MAC) acknowledgement (ACK) frame to acknowledge the low-overhead PPDU, the short MAC ACK frame excluding one or more fields of an ACK frame outside the S-TxOP.

Example 13 includes the subject matter of Example 12, and optionally, wherein the short MAC ACK frame excludes at least one of a duration field or a Receiver Address (RA) field.

Example 14 includes the subject matter of Example 12 or 13, and optionally, wherein the short MAC ACK frame comprises no more than a frame control field and a Frame Check Sequence (FCS) field.

Example 15 includes the subject matter of Example 14, and optionally, wherein the FCS field comprises no more than 4 bytes.

Example 16 includes the subject matter of Example 12 or 13, and optionally, wherein the short MAC ACK frame comprises a short MAC Block ACK (BACK) comprising a short bitmap corresponding to a plurality of MAC Protocol Data Units (MPDUs), the short bitmap comprising less than 8 octets.

Example 17 includes the subject matter of Example 16, and optionally, wherein the short MAC BACK comprises a starting sequence number.

Example 18 includes the subject matter of Example 16, and optionally, wherein the apparatus is configured to cause the AP to set the short MAC BACK to implicitly acknowledge frames in a last received Aggregate MPDU (AMPDU) by excluding a sequence control field from the short MAC BACK.

Example 19 includes the subject matter of any one of Examples 1-18, and optionally, wherein the low-overhead preamble is configured to indicate a length of the low-overhead PPDU.

Example 20 includes the subject matter of any one of Examples 1-19, and optionally, wherein a unified Signal (U-SIG) field in the low-overhead preamble is configured to indicate a length of the low-overhead PPDU.

Example 21 includes the subject matter of any one of Examples 1-20, and optionally, wherein the apparatus is configured to cause the AP to transmit the low-overhead PPDU as a Downlink (DL) PPDU to the STA of the second STA type.

Example 22 includes the subject matter of any one of Examples 1-20, and optionally, wherein the apparatus is configured to cause the AP to process the low-overhead PPDU as an Uplink (UL) PPDU received from the STA of the second STA type.

Example 23 includes the subject matter of any one of Examples 1-22, and optionally, wherein the STA of the first STA type comprises a legacy STA, and the STA of the second STA type comprises a non-legacy STA.

Example 24 includes the subject matter of any one of Examples 1-23, and optionally, comprising at least one radio to transmit the frame, and to communicate the low-overhead PPDU.

Example 25 includes the subject matter of Example 24, and optionally, comprising one or more antennas connected to the radio, and a processor to execute instructions of an operating system of the AP.

Example 26 includes an apparatus comprising logic and circuitry configured to cause a wireless communication station (STA) to process a frame received from an Access Point (AP) over a wireless communication channel, the frame comprising a field according to a first Physical layer Protocol Data Unit (PPDU) version decodable by STAs of a first STA type, the field configured to indicate to the STAs of the first STA type that the wireless communication channel is to be reserved for a reserved duration; and communicate a low-overhead PPDU with the AP over the wireless communication channel during a Synchronized Transmit Opportunity (S-TxOP), wherein the S-TxOP is within the reserved period, wherein the low-overhead PPDU is configured according to a second PPDU version decodable by STAs of a second STA type, the low overhead PPDU comprising a low-overhead preamble excluding one or more preamble fields of the first PPDU version.

Example 27 includes the subject matter of Example 26, and optionally, wherein the frame comprises an S-TxOP trigger frame to initiate the S-TxOP.

Example 28 includes the subject matter of Example 27, and optionally, wherein the apparatus is configured to cause the STA to synchronize to the AP based on synchronization information in the S-TxOP trigger frame.

Example 29 includes the subject matter of Example 27 or 28, and optionally, wherein the S-TxOP comprises a plurality of transmission slots synchronized based on the S-TxOP trigger frame, wherein the low-overhead PPDU is communicated during a transmission slot of the plurality of transmission slots.

Example 30 includes the subject matter of any one of Examples 26-29, and optionally, wherein the frame comprises a control frame.

Example 31 includes the subject matter of Example 30, and optionally, wherein the control frame comprises a Request to Send (RTS) frame.

Example 32 includes the subject matter of any one of Examples 26-31, and optionally, wherein the first PPDU version comprises a non-High Throughput (non-HT) PPDU version decodable by non-HT STAs.

Example 33 includes the subject matter of Example 32, and optionally, wherein the frame comprises a non-HT duplicate format PPDU over a plurality of non-HT channels in the wireless communication channel.

Example 34 includes the subject matter of Example 32, and optionally, wherein the frame comprises an HT PPDU comprising a non-HT Signal (L-SIG) field, the L-SIG field comprising a length field based on a duration of the S-TxOP.

Example 35 includes the subject matter of any one of Examples 32-34, and optionally, wherein the low-overhead preamble excludes at least one of a non-HT Signal (L-SIG) field, a non-HT Short Training Field (L-STF), or a non-HT Long Training Field (L-LTF).

Example 36 includes the subject matter of any one of Examples 26-35, and optionally, wherein the apparatus is configured to cause the STA to communicate a short Media Access Control (MAC) acknowledgement (ACK) frame to acknowledge the low-overhead PPDU, the short MAC ACK frame excluding one or more fields of an ACK frame outside the S-TxOP.

Example 37 includes the subject matter of Example 36, and optionally, wherein the short MAC ACK frame excludes at least one of a duration field or a Receiver Address (RA) field.

Example 38 includes the subject matter of Example 36 or 37, and optionally, wherein the short MAC ACK frame comprises no more than a frame control field and a Frame Check Sequence (FCS) field.

Example 39 includes the subject matter of Example 38, and optionally, wherein the FCS field comprises no more than 4 bytes.

Example 40 includes the subject matter of Example 36 or 37, and optionally, wherein the short MAC ACK frame comprises a short MAC Block ACK (BACK) comprising a short bitmap corresponding to a plurality of MAC Protocol Data Units (MPDUs), the short bitmap comprising less than 8 octets.

Example 41 includes the subject matter of Example 40, and optionally, wherein the short MAC BACK comprises a starting sequence number.

Example 42 includes the subject matter of Example 40, and optionally, wherein the apparatus is configured to cause the STA to set the Short MAC BACK to implicitly acknowledge frames in a last received Aggregate MPDU (AMPDU) by excluding a sequence control field from the short MAC BACK.

Example 43 includes the subject matter of any one of Examples 26-42, and optionally, wherein the low-overhead preamble is configured to indicate a length of the low-overhead PPDU.

Example 44 includes the subject matter of any one of Examples 26-43, and optionally, wherein a unified Signal (U-SIG) field in the low-overhead preamble is configured to indicate a length of the low-overhead PPDU.

Example 45 includes the subject matter of any one of Examples 26-44, and optionally, wherein the apparatus is configured to cause the STA to process the low-overhead PPDU as a Downlink (DL) PPDU from the AP.

Example 46 includes the subject matter of any one of Examples 26-45, and optionally, wherein the apparatus is configured to cause the STA to transmit the low-overhead PPDU as an Uplink (UL) PPDU to the AP.

Example 47 includes the subject matter of any one of Examples 26-46, and optionally, wherein the STAs of the first STA type comprise legacy STAs, and the STAs of the second STA type comprise a non-legacy STAs.

Example 48 includes the subject matter of any one of Examples 26-47, and optionally, comprising at least one radio to receive the frame, and to communicate the low-overhead PPDU.

Example 49 includes the subject matter of Example 48, and optionally, comprising one or more antennas connected to the radio, and a processor to execute instructions of an operating system of the STA.

Example 50 comprises a wireless communication device comprising the apparatus of any of Examples 1-49.

Example 51 comprises an apparatus comprising means for executing any of the described operations of any of Examples 1-49.

Example 52 comprises a product comprising one or more tangible computer-readable non-transitory storage media comprising instructions operable to, when executed by at least one processor, enable the at least one processor to cause a wireless communication device to perform any of the described operations of any of Examples 1-49.

Example 53 comprises an apparatus comprising: a memory interface; and processing circuitry configured to: perform any of the described operations of any of Examples 1-49.

Example 54 comprises a method comprising any of the described operations of any of Examples 1-49.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause an Access Point (AP) to:
   transmit a frame over a wireless communication channel, the frame comprising a field according to a first Physical layer Protocol Data Unit (PPDU) version decodable by a wireless communication (STA) of a first STA type, the field configured to indicate to the STA of the first STA type that the wireless communication channel is to be reserved for a reserved duration; and
   communicate a low-overhead PPDU with a STA of a second STA type over the wireless communication channel during a Synchronized Transmit Opportunity (S-TxOP), wherein the S-TxOP is within the reserved duration, wherein the low-overhead PPDU is configured according to a second PPDU version decodable by the STA of the second STA type, the low overhead PPDU comprising a low-overhead preamble excluding one or more preamble fields of the first PPDU version.

2. The apparatus of claim 1, wherein the frame comprises an S-TxOP trigger frame to initiate the S-TxOP.

3. The apparatus of claim 2, wherein the S-TxOP trigger frame comprises synchronization information to synchronize one or more STAs of the second STA type to the AP.

4. The apparatus of claim 2, wherein the S-TxOP comprises a plurality of transmission slots synchronized based on the S-TxOP trigger frame, wherein the low-overhead PPDU is communicated during a transmission slot of the plurality of transmission slots.

5. The apparatus of claim 1 configured to cause the AP to communicate during the S-TxOP a PPDU according to the first PPDU version to set a Network Allocation Vector (NAV) according to the S-TxOP.

6. The apparatus of claim 1, wherein the first PPDU version comprises a non-High Throughput (non-HT) PPDU version decodable by non-HT STAs.

7. The apparatus of claim 6 configured to cause the AP to transmit the frame as a non-HT duplicate format PPDU over a plurality of non-HT channels in the wireless communication channel.

8. The apparatus of claim 6 configured to cause the AP to transmit the frame as an HT PPDU comprising a non-HT Signal (L-SIG) field, the L-SIG field comprising a length field based on a duration of the S-TxOP.

9. The apparatus of claim 6, wherein the low-overhead preamble excludes at least one of a non-HT Signal (L-SIG) field, a non-HT Short Training Field (L-STF), or a non-HT Long Training Field (L-LTF).

10. The apparatus of claim 1 configured to cause the AP to communicate a short Media Access Control (MAC) acknowledgement (ACK) frame to acknowledge the low-overhead PPDU, the short MAC ACK frame excluding one or more fields of an ACK frame outside the S-TxOP.

11. The apparatus of claim 10, wherein the short MAC ACK frame excludes at least one of a duration field or a Receiver Address (RA) field.

12. The apparatus of claim 10, wherein the short MAC ACK frame comprises no more than a frame control field and a Frame Check Sequence (FCS) field.

13. The apparatus of claim 12, wherein the FCS field comprises no more than 4 bytes.

14. The apparatus of claim 10, wherein the short MAC ACK frame comprises a short MAC Block ACK (BACK) comprising a short bitmap corresponding to a plurality of MAC Protocol Data Units (MPDUs), the short bitmap comprising less than 8 octets.

15. The apparatus of claim 14, wherein the short MAC BACK comprises a starting sequence number.

16. The apparatus of claim 14 configured to cause the AP to set the short MAC BACK to implicitly acknowledge frames in a last received Aggregate MPDU (AMPDU) by excluding a sequence control field from the short MAC BACK.

17. The apparatus of claim 1, wherein the low-overhead preamble is configured to indicate a length of the low-overhead PPDU.

18. The apparatus of claim 1, wherein a unified Signal (U-SIG) field in the low-overhead preamble is configured to indicate a length of the low-overhead PPDU.

19. The apparatus of claim 1 comprising at least one radio to transmit the frame, and to communicate the low-overhead PPDU.

20. The apparatus of claim 19 comprising one or more antennas connected to the radio, and a processor to execute instructions of an operating system of the AP.

21. An apparatus comprising logic and circuitry configured to cause a wireless communication station (STA) to:
   process a frame received from an Access Point (AP) over a wireless communication channel, the frame comprising a field according to a first Physical layer Protocol Data Unit (PPDU) version decodable by STAs of a first STA type, the field configured to indicate to the STAs of the first STA type that the wireless communication channel is to be reserved for a reserved duration; and
   communicate a low-overhead PPDU with the AP over the wireless communication channel during a Synchronized Transmit Opportunity (S-TxOP), wherein the S-TxOP is within the reserved duration, wherein the low-overhead PPDU is configured according to a second PPDU version decodable by STAs of a second STA type, the low overhead PPDU comprising a low-overhead preamble excluding one or more preamble fields of the first PPDU version.

22. The apparatus of claim 21, wherein the frame comprises an S-TxOP trigger frame to initiate the S-TxOP.

23. The apparatus of claim 21 configured to cause the STA to communicate a short Media Access Control (MAC) acknowledgement (ACK) frame to acknowledge the low-overhead PPDU, the short MAC ACK frame excluding one or more fields of an ACK frame outside the S-TxOP.

24. A product comprising one or more tangible computer-readable non-transitory storage media comprising instructions operable to, when executed by at least one processor, enable the at least one processor to cause an Access Point (AP) to:

transmit a frame over a wireless communication channel, the frame comprising a field according to a first Physical layer Protocol Data Unit (PPDU) version decodable by a wireless communication (STA) of a first STA type, the field configured to indicate to the STA of the first STA type that the wireless communication channel is to be reserved for a reserved duration; and communicate a low-overhead PPDU with a STA of a second STA type over the wireless communication channel during a Synchronized Transmit Opportunity (S-TxOP), wherein the S-TxOP is within the reserved duration, wherein the low-overhead PPDU is configured according to a second PPDU version decodable by the STA of the second STA type, the low overhead PPDU comprising a low-overhead preamble excluding one or more preamble fields of the first PPDU version.

25. The product of claim 24, wherein the instructions, when executed, cause the AP to communicate a short Media Access Control (MAC) acknowledgement (ACK) frame to acknowledge the low-overhead PPDU, the short MAC ACK frame excluding one or more fields of an ACK frame outside the S-TxOP.

* * * * *